(12) United States Patent
Mickens et al.

(10) Patent No.: US 8,140,646 B2
(45) Date of Patent: Mar. 20, 2012

(54) NETWORK APPLICATION PERFORMANCE ENHANCEMENT USING SPECULATIVE EXECUTION

(75) Inventors: James W. Mickens, Bellevue, WA (US); Jonathan R. Howell, Seattle, WA (US); Jacob R. Lorch, Bellevue, WA (US); Jeremy E. Elson, Kirkland, WA (US); Edmund B. Nightingale, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 12/478,595

(22) Filed: Jun. 4, 2009

(65) Prior Publication Data

US 2010/0312858 A1 Dec. 9, 2010

(51) Int. Cl.
G06F 15/16 (2006.01)
G06F 7/44 (2006.01)
G06F 17/00 (2006.01)
G06F 17/20 (2006.01)

(52) U.S. Cl. ........ 709/219; 709/203; 709/218; 717/172; 717/173; 715/200; 715/204; 715/205

(58) Field of Classification Search .......... 715/205–208, 715/240; 717/168–173; 709/224, 219, 217, 709/203, 232, 226, 223
See application file for complete search history.

(56) References Cited

U.S. PATENT DOCUMENTS

| | | | | |
|---|---|---|---|---|
| 6,415,316 B1* | 7/2002 | Van Der Meer | ............... | 709/203 |
| 6,564,213 B1* | 5/2003 | Ortega et al. | ............... | 1/1 |
| 7,069,497 B1* | 6/2006 | Desai | ............... | 715/205 |
| 7,210,097 B1* | 4/2007 | Clarke et al. | ............... | 715/227 |
| 7,809,818 B2* | 10/2010 | Plamondon | ............... | 709/223 |
| 2002/0078165 A1* | 6/2002 | Genty et al. | ............... | 709/217 |
| 2002/0199001 A1 | 12/2002 | Wenocur et al. | | |
| 2005/0138143 A1* | 6/2005 | Thompson | ............... | 709/218 |
| 2006/0036426 A1 | 2/2006 | Barr et al. | | |
| 2006/0069617 A1* | 3/2006 | Milener et al. | ............... | 705/14 |
| 2006/0168101 A1* | 7/2006 | Mikhailov et al. | ............... | 709/217 |
| 2007/0174597 A1 | 7/2007 | Joy et al. | | |
| 2008/0022229 A1* | 1/2008 | Bhumkar et al. | ............... | 715/838 |
| 2008/0077655 A1* | 3/2008 | Ganapathy et al. | ............... | 709/203 |
| 2009/0198787 A1* | 8/2009 | Broda et al. | ............... | 709/209 |
| 2009/0204885 A1* | 8/2009 | Ellsworth et al. | ............... | 715/234 |
| 2010/0174774 A1* | 7/2010 | Kern et al. | ............... | 709/203 |
| 2010/0281400 A1* | 11/2010 | Forutanpour et al. | ............... | 715/760 |
| 2010/0306636 A1* | 12/2010 | Ran et al. | ............... | 715/205 |
| 2010/0306642 A1* | 12/2010 | Lowet et al. | ............... | 715/234 |

OTHER PUBLICATIONS

Zhang et. al. "Memory system support for image processing", University of Utah, 2000 p. 1-10.*

(Continued)

*Primary Examiner* — Joseph Avellino
*Assistant Examiner* — Aftab Nasir Khan
(74) *Attorney, Agent, or Firm* — Lee & Hayes, PLLC

(57) ABSTRACT

A speculative web browser engine may enable providing transmission of content between a server and a client prior to a user-initiated request for the content hidden in imperative code (event handlers), which may reduce user-perceived latency when the user initiates the imperative code. In some aspects, a speculative browser state may be created from an actual browser state and used to run the event handlers. The event handlers may be modified to direct actions of the event handler to update the speculative browser state. Speculative content may be transmitted between the server and the client in response to an execution of the modified code. The speculative content may be stored in a cache and made readily available for use when the user initiates the event handler and finds that the desired content has already been fetched.

16 Claims, 9 Drawing Sheets

OTHER PUBLICATIONS

"Byzantium-Byzantium: Eficient Byzantine Fault-Tolerant Database Replication", retrieved on Apr. 15, 2009 at <<http://citi.di.fct.unl.pt/project/project.php?id=60>>, 2007 CITI, 4 pages.

Chang et al., "Automatic I/O Hint Generation Through Speculative Execution", retrieved on Apr. 14, 2009 at <<http://www.pdl.cmu.edu/PDL-FTP/TIP/osdi-distrib.pdf>>, Proceedings of the 3rd Symposium on Operating Systems Design and Implementation, Feb. 1999, 14 pages.

Chang, "Using Speculative Execution to Automaticaly Hide I/O Latency", retrieved on Apr. 14, 2009 at <<http://www.pdl.cmu.edu/PDL-FTP/TIP/CMU-CS-01-172.pdf>>, School of Computer Science, Carnegie Mellon University, Pittsburgh, PA, Dec. 7, 2001, 187 pages.

Chen et al., "Hiding I/O Latency with Pre-Execution Prefetching for Parallel Applications", retrieved on Apr. 14, 2009 at <<http://delivery.acm.org/10.1145/1420000/1413411/a40-chen.pdf?key1=1413411&key2=2047979321&coll=GUIDE&dl=GUIDE&CFID=30448225&CFTOKEN=65426952>>, SC2008 Nov. 2008, Austin, TX, IEEE., 10 pages.

Crovella et al., "Self-Similarity in World Wide Web Traffic: Evidence and Possible Causes", retrieved on Apr. 14, 2009 at <<http://www.cs.bu.edu/fac/best/res/papers/ton97.pdf>>, IEEE/ACM Transactions on Networking, vol. 5, No. 6, Dec. 1997, pp. 835-846.

Crovella et al., "The Network Effects of Prefetching", retrieved on Apr. 14, 2009 at <<https://eprints.kfupm.edu.sa/70643/1/70643.pdf>>, Proceedings of IEEE Infocom 1998, San Francisco, CA., 8 pages.

Dahlstrom, "High-Level Speculative Execution Based on Predictive User Modeling", retrieved on Apr. 14, 2009 at <<http://www.cs.ucsd.edu/~ddahlstr/misc/nsf/plan.pdf>>, Nov. 7, 2002, 2 pages.

Davison, "Assertion: Prefetching With GET is Not Good", retrieved on Apr. 14, 2009 at <<http://www.iwcw.org/2001-017-wcw01-proceedings/119_davison.pdf>>, Department of Computer Science, Rutgers, The State University of New Jersey, 9 pages.

"Decimail Server", retrieved on Apr. 15, 2009 at <<http://freshmeat.net/projects/decimail/>>, SourceForge, Inc., 2009, 4 pages.

"DHTML Tab Script", retrieved on Apr. 15, 2009 at <<http://www.dhtmlgoodies.com/scripts/tab-view/tab-view.html>>, 1 page.

"Document Object Model (DOM)", retrieved on Apr. 15, 2009 at <<http://www.w3.org/DOM>>, Jan. 19, 2005, 3 pages.

Fielding et al., "Hypertext Transfer Protocol", retrieved on Apr. 14, 2009 at <<http://www.ietf.org/rfc/rfc2616.txt>>, Jun. 1999, The Internet Society, 1999, 165 pages.

Fraser et al., "Operating System I/O Speculation: How Two Invocations are Faster Than One", retrieved on Apr. 14, 2009 at <<www.cs.cmu.edu/~fwc/usenix03.ps>>, 14 pages.

Garrett, "Ajax: A New Approach to Web Applications", retrieved on Apr. 15, 2009 at <<http://www.adaptivepath.com/ideas/essays/archives/000385.php>>, Adaptive path essay archives, Feb. 18, 2005, 5 pages.

Korner, "Intelligent Caching for Remote File Service", retrieved on Apr. 15, 2009 at <<http://ieeexplore.ieee.org/stamp/stamp.jsp?tp=&arnumber=89275&isnumber=2912>>, Computer Science Department, USC, CA., copyright 1990, IEEE, pp. 220-226.

Kroeger et al., "Exploring the Bounds of Web Latency Reduction from Caching and Prefetching", retrieved on Apr. 14, 2009 at <<http://www.usenix.com/publications/library/proceedings/usits97/full_papers/kroeger/kroeger.pdf>>, Proceedings of the USENIX Symposium on Internet Technologies and Systems, Montery, CA., Dec. 1997, 11 pages.

Markatos et al., "A Top-10 Approach to Prefetching the Web", retrieved on Apr. 15, 2009 at <<http://www.ics.forth.gr/carv/r-d-activites/wwwPerf/INET98_prefetch/>>, Institute of Computer Science, Foundation for Research and Technology-Hellas, Crete, Greece, 18 pages.

Martin et al., "Using Destination-Set Prediction to Improve the Latency/Bandwidth Tradeoff in Shared-Memory Multiprocessors", retrieved on Apr. 14, 2009 at <<http://repository.upenn.edu/cgi/viewcontent.cgi?article=1281&context=cis_papers>>, Proceedings of the 30th Annual International Symposium on Computer Architecture (ISCA 2003), 13 pages.

Nightingale et al., "Speculative Execution in a Distributed File System", retrieved on Apr. 14, 2009 at <<http://portal.acm.org/ft_gateway.cfm?id=1095829&type=pdf&coll=GUIDE&dl=GUIDE&CFID=31255845&CFTOKEN=22819832>>, SOSP 2005, Oct. 23-26, 2005, Brighton, UK, pp. 191-205.

Padmanabhan et al., "Using Predictive Prefetching to Improve World Wide Web Latency", retrieved on Apr. 14, 2009 at <<http://www.sigcomm.org/ccr/archive/1996/jul96/ccr-9607-mogul-padmanabhan.pdf?searchterm=pipelining>>, 15 pages.

Papathanasiou et al., "Aggressive Prefetching: An Idea Whose Time Has Come", retrieved on Apr. 14, 2009 at <<http://www.cs.rochester.edu/u/papathan/papers/2005-hotos05/papathan-hotos05-final-html/>>, University of Rochester, 9 pages.

Patterson et al., "Informed Prefetching and Caching", retrieved on Apr. 14, 2009 at <<http://portal.acm.org/ft_gateway.cfm?id=224064&type=pdf&coll=GUIDE&dl=GUIDE&CFID=31255967&CFTOKEN=24575738>>, SIGOPS 1995, 12/95 CO., USA., pp. 79-95.

Pitkow et al., "Mining Longest Repeating Subsequences to Predict World Wide Web Surfing", retrieved on Apr. 14, 2009 at <<http://www.usenix.org/events/usits99/full_papers/pitkow/pitkow.ps>>, 12 pages.

"Script.Aculo.US Javascript Library", retrieved on Apr. 17, 2009 at <<http://script.aculo.us>>, Web 2.0 javascript, 4 pgs.

Smith, "Analysis of Long Term File Reference Patterns for Application to File Migration Algorithms", retrieved on Apr. 14, 2009 at <<http://ieeexplore.ieee.org/xpl/freeabs_all.jsp?arnumber=1702861>>, IEEE Transactions on Software Engineering, vol. SE-7, No. 4, Jul. 1981, pp. 403-417.

Stockwell, "IE8 Performance", retrieved on Apr. 15, 2009 at <<http://blogs.msdn.com/ie/archive/2008/08/26/ie8-performance.aspx>>, Aug. 26, 2008, 15 pages.

Tait et al., "Detection and Exploitation of File Working Sets", retrieved on Apr. 15, 2009 at <<http://ieeexplore.ieee.org/xpl/freeabs_all.jsp?arnumber=148635>>, Computer Science Department, Columbia Univ., IEEE 1991, pp. 2-9.

Yang, et al., "A Decoupled Architecture for Application-Specific File Prefetching", retrieved on Apr. 14, 2009 at <<http://citeseerx.ist.psu.edu/viewdoc/download;jsessionid=0079182097EA45242FCACC73D____5232EC0?doi=10.1.1.18.6828&rep=rep1&type=pdf>>, Computer Science Department, Stony Brook Univ., Stony Brook, NY, 14 pages.

Younis, et al., "Statically Safe Speculative Execution for Real-Time Systems", retrieved on Apr. 14, 2009 at <<http://ieeexplore.ieee.org/stamp/stamp.jsp?arnumber=00815328>>, IEEE Transactions on Software Engineering, vol. 25, No. 5, Sep./Oct. 1999, pp. 701-721.

Flanagan, "JavaScript The Definitive Guide", 5th Edition, Aug. 2006.

* cited by examiner

NETWORK APPLICATION PERFORMANCE ENHANCEMENT USING SPECULATIVE EXECUTION

BACKGROUND

Early web content was primarily displayed as static content that only enabled limited user interaction, if any at all. For example, early web content was typically characterized by large amounts of text and images that were formatted in a layout using various Hyper Text Markup Language (HTML) formatting operations. Pages included static links to other pages and/or content, and user interaction was typically limited to clicking on these links. In contrast, modern web pages often include rich Internet applications (RIA) that support large amounts of user interaction with dynamically created content.

Prefetching is an act of extracting (fetching) network-based content from a server prior to an actual request instantiated by a user. For example, suppose that a user is currently viewing page X in a web browser, and page X links to a different page Y. The user's client computer may prefetch the content associated with page Y, downloading it as the user views the original page X. Later, when the user requests the linked page Y, the content will already be on the user's machine, thus reducing perceived delays (e.g., network transmission latency) for accessing the content. Prefetching early website content was relatively straightforward because a page could be quickly analyzed by a server or client computer to identify items that could be prefetched. HTML code, for example, could be searched for tags that indicated the presence of a link, image, or other content that could be prefetched by the client. However, with the introduction of more complex web pages that hide content behind imperative JavaScript event handlers (executable programs), additional challenges have been introduced to traditional prefetching implementations.

A modern website often includes dynamic (rich) features that allow a user to interact with the website. When the user generates an interaction event, e.g., by clicking on a particular feature, the browser executes an event handler that the page has associated with that feature. The event handler is executable code run by the client computer to create an effect for the user to experience. Execution of the event handler, which is typically initiated by the user, may then require additional transfer of content between the server and the client, and may create transmission latency that is perceived by the user.

SUMMARY

A speculative web browser engine may enable a reduction of user-perceived latency when a user navigates a web page that includes rich Internet applications (RIA). The speculative engine may provide for transmission of content between a server and a client prior to a user-initiated request for the content hidden in imperative code (event handlers), which may reduce user-perceived latency when the user initiates the imperative code.

In some aspects, speculative browser state may be created from actual browser state and used to run event handlers. The event handlers may be modified to update the speculative browser state instead of the foreground, user-visible state. Speculative content may be transmitted between the server and the client in response to an execution of the modified event handlers. The speculative content may be stored in a cache and made readily available for use when the user initiates the event handler and requests content that has already been fetched.

In additional aspects, the speculative engine may generate a speculative layout using the speculative content to reduce user-perceived latency when the browser must display the speculative content. In addition, the speculative engine may speculatively upload content from the client to the server in anticipation of a user-triggered upload of the speculative content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, the web includes rich Internet applications (RIA) that enable large amounts of user interaction on the web. The introduction of RIAs that include event handlers (or other imperative code) has complicated traditional approaches to prefetching content that can be used to reduce user-perceived latencies associated with a transmission of web content between a server and a client. Event handlers are program statements that are executed in response to user-initiated events such as a keystroke or a mouse movement. An illustrative generic speculative engine (speculative engine) is disclosed herein that simplifies providing low user-perceived latency when a user interacts with RIAs. In some embodiments, the speculative engine may take preexisting, non-speculative event handlers and create speculative versions which are run in a cloned browser context that is not visible to the user.

The speculative engine may reduce user-perceived latency when content is hidden behind imperative code (e.g., JavaScript code, etc.) by performing speculative execution of the imperative code. The speculative execution may reveal content that may then be prefetched from the server to the client to reduce user-perceived latency. The speculative engine may also reduce user-perceived latency by speculatively uploading content from the client to the server. The speculative engine may further generate speculative layouts of prefetched content.

In addition, the speculative engine may analyze user events (inputs) to determine possible outcomes and avoid speculating on outcomes that have already been speculated upon. In addition, the speculative engine may be used to spread peaks in server load over other time segments to further reduce user-perceived delays. The server loads may be smoothed by immediately servicing speculative requests if server load is low, and deprioritizing speculative requests if server load is high.

The processes and systems described herein may be implemented in a number of ways. Example implementations are provided below with reference to the following figures.

Illustrative Environment

Figure 1:
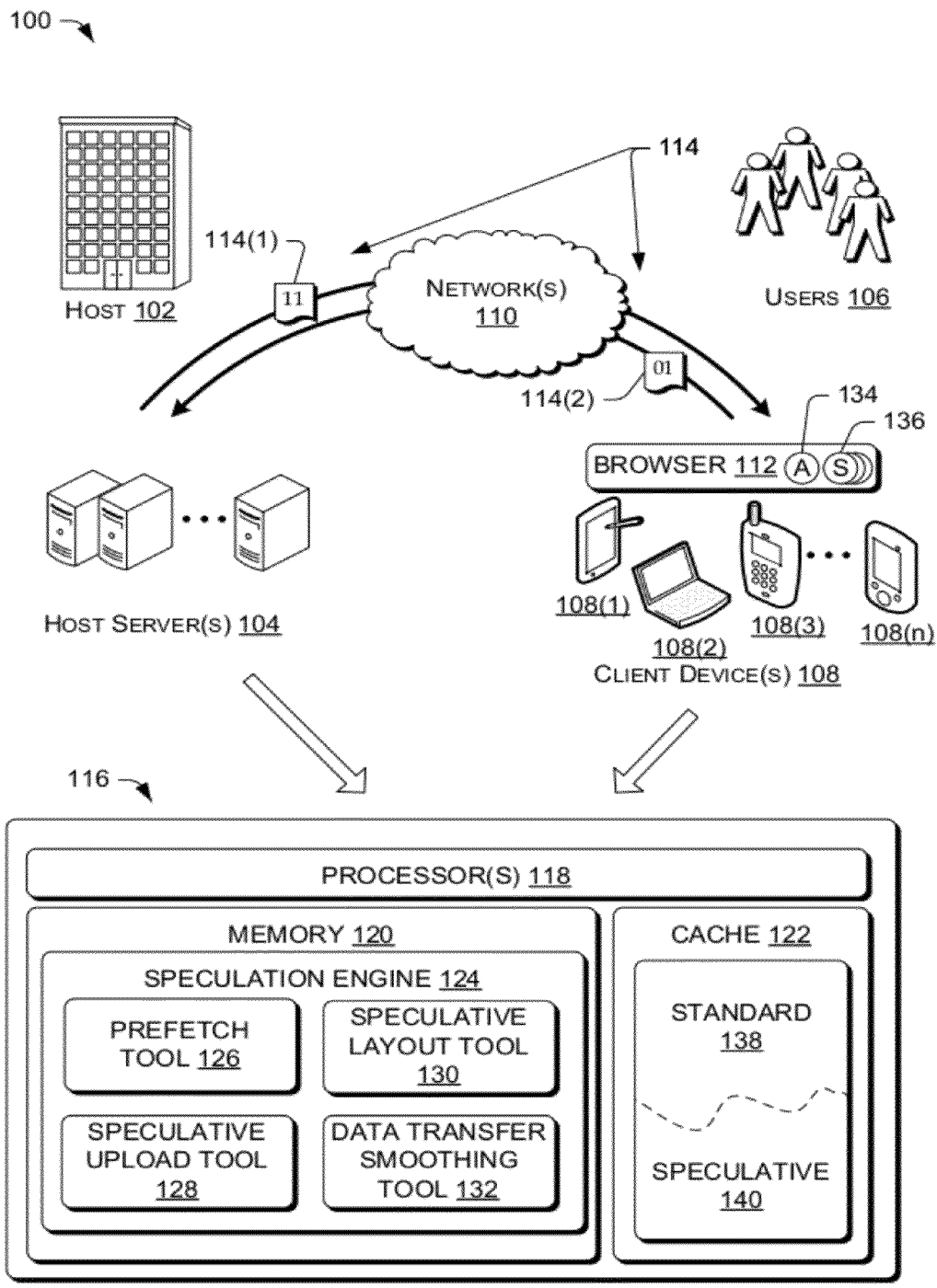
FIG. 1 is a schematic diagram of an illustrative environment that includes a server and a client that exchange data using speculative execution of event handlers.

FIG. 1 is a schematic diagram of an illustrative environment 100 that provides speculative execution of event handlers. The environment 100 includes a host 102 and associated host server(s) 104 (or simply "servers"). The host 102 is a content provider of rich Internet applications (RIA) such as web content that includes event handlers that may employ, e.g., JavaScript code. As an example, the servers 104 may be configured as one or more servers (e.g., a server farm, e-commerce host, multimedia website host, etc.) that are accessible via a network (e.g., the Internet).

The host 102 may communicate with users 106, each having one or more associated client devices 108 (or simply "clients"). A network(s) 110 may facilitate transfer of content between the servers 104 and the clients 108. The network(s) 110 may include one or more of wired or wireless networks including a non-exhaustive list of Wi-Fi, mobile telephone, Bluetooth® or other network types.

The clients 108 may be any type of computing device that is enabled to send and receive content 114, via the network 110, with the servers 104. A non-exhaustive list of possible clients 108(1)-(n) may include a personal digital assistant 108(1), a personal computer 108(2), a mobile computer 108(3), and a music player 108(n). In accordance with embodiments, the clients 108 may include a browser 112 to process, format, and present to the users 106 any content 114(n) that is received from the servers 104.

The content 114(n) may include downloaded content 114(1), which originates at the server 104 and is transmitted to at least one of the clients 108, and/or uploaded content 114(2), which originates at any one of the clients 108 and is transmitted to the server 104. In some embodiments, the downloaded content 114(1) may include imperative code (event handlers), such as JavaScript, which may be executed by the client 108. The imperative code may be speculatively executed by the server 104 and/or the client 108 to reduce user-perceived latency due to network bandwidth or hardware processing. Thus, the downloaded content 114(1) may include speculative downloads of content that has not yet been initiated by the user 106, but when requested by the user 106, may reduce user-perceived latency often associated with network bandwidth limitations. In various embodiments, the downloaded content 114(1) is stored in a cache on the client 108, which is accessible by the browser 112 (i.e., browser cache).

In accordance with various embodiments, the uploaded content 114(2) may include speculative uploads, which are uploads that are transmitted from the client 108 to the server 104 in anticipation of a user action to initiate the upload. Speculative uploads may reduce user-perceived latency of the upload processing. If the user 106 does not initiate the transmission of the uploaded content 114(2), such as by interacting with imperative code, then the server 104 may discard the uploaded content 114(2) at a later time.

As illustrated, the server 104 and/or the clients 108(1)-(n) may be equipped with various computing hardware 116 to enable the servers 104 and/or the clients 108(1)-(n) to provide speculative execution of rich Internet content. The computing hardware 116 may include one or more processors 118, memory 120, and cache 122. The memory 120 may include applications, modules, and/or data. In some embodiments, the memory 120 may include a speculative engine 124.

The speculative engine 124 may include various software components that may include a prefetch tool 126, a speculative upload tool 128, a speculative layout tool 130, and a data transfer smoothing tool 132 (or simply "smoothing tool"). The speculative engine 124 may be used by the server 104 and/or the clients 108(1)-(n) to reduce user-perceived latency, and in some instances, reduce computing latencies.

In some embodiments, the prefetch tool 126 may execute imperative code and then initiate a speculative transfer of content (prefetch) prior to a user-initiated request for the content. The speculative upload tool 128 may enable a speculative upload of content from the client 108 to the server 104 prior to a user initiated-request for the upload of content. The speculative layout tool 130 may generate a speculative layout of content prior to a user-initiated request for the layout. In some embodiments, the speculative layout tool 130 may use content obtained by the prefetch tool 126 and/or the speculative upload tool 128 to generate the speculative layout. Finally, the smoothing tool 132 may queue data requests to a server based on whether the request is for speculative content or content initiated by a user action, which may ultimately improve server response time to the client for user-initiated requests.

The browser 112 may include a browser state 134 of RIAs, HTML code, and so forth. The speculative engine 124 may run in one or more speculative browser states 136 that are copies of at least a portion of the browser state 134. In this way, speculative execution of event handlers by the speculative engine 124 may not be visible to the users 106, which would otherwise be disrupting to the browsing experience of the user.

In accordance with various embodiments, the cache 122 may include two types of illustrative content types: standard content 138 and speculative content 140. However, the cache 122 may not include an actual distinction (separation, identifier, etc.) between the standard content 138 and speculative content 140. The standard content 138 is content that is generated by a user-initiated request. The speculative content 140 is content that is generated by the prefetch tool 126, the speculative upload tool 128, and/or the speculative layout tool 130, and thus is not generated directly from a user-initiated request.

In an example, the cache 122 may be browser cache implemented on any one of the clients 108(1)-(n), which is accessed by the browser 112 to reduce user-perceived latency by avoiding a network transfer of content with the server 104 when content (e.g., the standard content 138) is obtainable from the cache on the client. The speculative content 140 may be accessed by the browser 112 (or other applications) in a similar manner as a browser access of the standard content 138.

Figure 2:
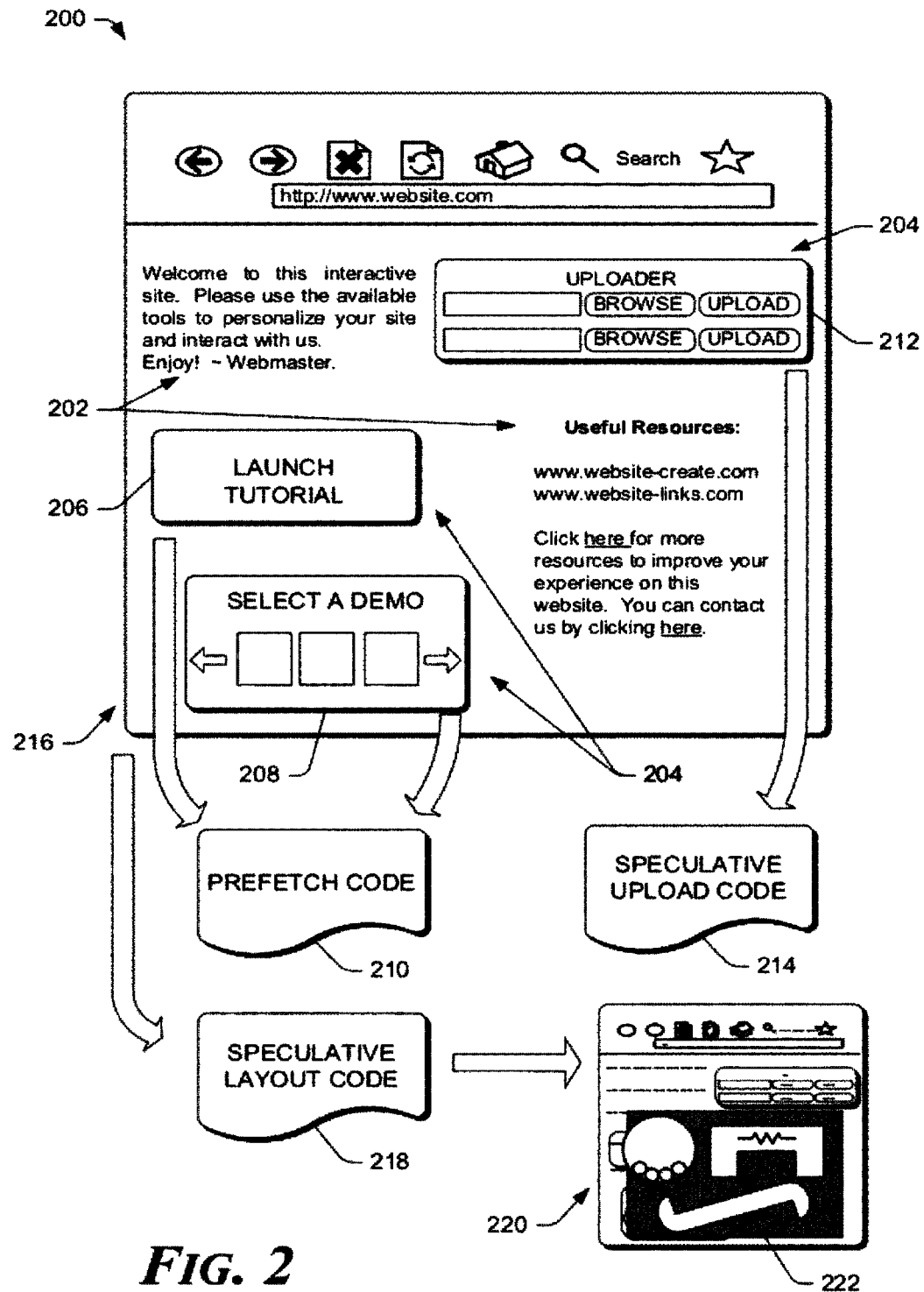
FIG. 2 is an illustrative web page that may include event handlers that trigger a transfer of content between a server and a client.

FIG. 2 shows an illustrative web page 200 that may include event handlers that trigger a transfer of content (upload/download) between the server 104 and at least one of the clients 108(1)-(n). The web page 200 may include static content 202 and dynamic content 204. The static content 202 may include text, images, links, and other content that does not require execution of an application. The dynamic content 204 may include user imperative code (event handlers, JavaScript, etc.) that may be run by the any one of the clients 108(1)-(n) (or server 104 in some instances) to obtain a result such as request for content from the server 104 (or any one of the clients 108(1)-(n) in some instances). The fetched content may also be dynamic, since its constituent parts may be determined by the particular nature of a specific user request.

The dynamic content 204 may include a first piece of dynamic content 206 and a second piece of dynamic content 208 (among many possible pieces of dynamic content on a RIA web page). The first piece of dynamic content 206 may perform a first action when a user requests the dynamic content 206. For example, the user may click a button, hover over a space (e.g., with a cursor), or take some other action to initiate execution of the first piece of dynamic content 206. The second piece of dynamic content 208 may be executed via similar types of user input. The first and second pieces of dynamic content 206, 208 (and other possible pieces of dynamic code) may be identified by the prefetch tool 126 and associated with prefetch code 210. The prefetch code 210 may enable speculative execution of the first and second pieces of dynamic content 206, 208 to determine whether a further transfer of content may be initiated between the server 104 and the at least one of the clients 108(1)-(n). The content may then be prefetched and stored in the cache 122 as the speculative content 140.

A dynamic content uploader 212 may enable an upload of content from at least one of the clients 108(1)-(n) to the server 104. The dynamic content uploader 212 may be identified by the speculative upload tool 128 and associated with speculative upload code 214. The speculative upload code 214 may enable speculative execution of the dynamic content uploader 212 to initiate the upload of content from at least one of the clients 108(1)-(n) to the server 104 before a user-initiated request. Thus, the speculative upload code 214 may perform the upload prior to a user request to reduce a user-perceived latency after the user initiates the upload.

Finally, a layout 216 may be identified for each instance of the static content 202 and dynamic content 204. When the dynamic content 204 (e.g., the first or second pieces of dynamic content 206, 208, etc.) is requested by the user 106 and results in additional content being fetched, the layout 216 may be modified to create a new layout that contains content referenced by user requests for the dynamic content 204.

A layout configuration of the layout 216 may be identified by the speculative layout tool 128 and associated with speculative layout code 218. The speculative upload code 218 may enable creation of a speculative layout 220 which may include the additional content (speculative content) 222 retrieved from the server 104 after execution of the dynamic content 204 of the page 200. Thus, the speculative upload code 214 may generate the speculative layout 220 prior to a user action and thus reduce a user-perceived latency after the user takes an action that triggers user imperative code.

Illustrative Operation

Figure 3:
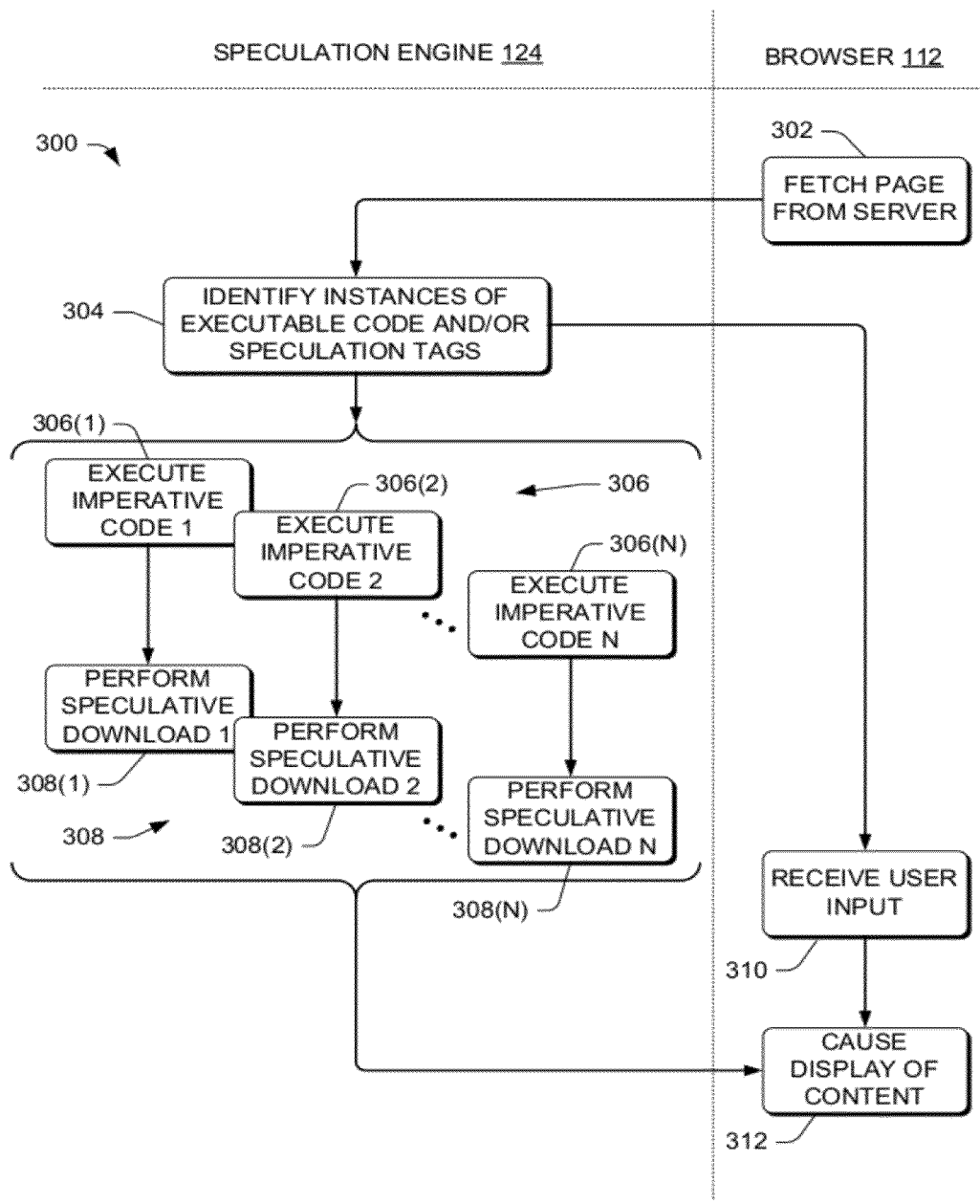
FIG. 3 is a flow diagram of an illustrative process for providing speculative execution of event handlers on a web page to initiate prefetching of content from a server to a client.

FIG. 3 is a flow diagram of an illustrative process 300 for providing speculative execution of event handlers on a web page to initiate prefetching of content from the server 104 to any one of the clients 108(1)-(n). The process 300 is organized to depict the component (e.g., the speculative engine 124 or the browser 112) that is most likely to participate in the described operation.

The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 300. Other processes described throughout this disclosure, in addition to process 300, shall be interpreted accordingly.

At 302, the browser 112 may fetch a web page from the server 104 for display to the user 106 via any one of the clients 108(1)-(n). The speculative engine 124, using the prefetch tool 126, may identify instances of executable (imperative) code of the web page. For example, the speculative engine 124 may search the web page for calls to executable code or other indicators that enable identification of executable code.

At 306, the prefetch tool 126 may execute the imperative code to obtain a result of the event handler. The imperative code may be executed in the speculative browser state 136 such that the executed code does not disrupt a user experience (i.e., use of the browser 112). Thus, the user may be unaware of the execution of the imperative code at 306. As shown in the process 300, multiple instances of executable code may be executed by the prefetch tool, such as at 306(1)-306(N).

At 308, the prefetch tool 126 may perform a speculative download based on the result identified at the operation 306. The executions of the imperative code at 306(1)-306(N) may be used to identify speculative content to perform a speculative download 308(1)-308(N), respectively. The speculative content may then be stored in the cache 122 (on any one of the clients 108(1)-(n)) to enable reducing user-perceived latency when user input is received to initiate an instance of the imperative code.

At 310, the browser 112 may receive user input for an instance of the imperative code that has been executed at 306 and has had content speculatively downloaded at 308. The browser 112 may execute the user imperative code, determine content requested by the code, and then search the cache 122 for the speculative content, which may be present in the cache if it was downloaded at the operation 308.

At 312, the browser may cause the display of the content downloaded at 308, and thus reduce user-perceived latency by prefetching the content from the server 104.

As an example of process 300, a simple photo slide show or interactive map application may incur latency when transmitting (pulling) images through a low-bandwidth network connection from the server 104 to one or more of the clients 108(1)-(n). In another example, when the user 106 triggers the creation of a new tab in a tabbed browsing experience using a DHTML Goodies tab manager, new content is fetched over a potentially slow network link before it can be displayed in the new tab. Speculating on user operations (e.g., next photo, load new tab, etc.) can reduce user-perceived latency by identifying the content requests that are hidden inside imperative code. A speculative execution may fetch content (e.g., an image, etc.) at the operation 308 as speculative content that would incur high latency during network transmission of the content. The speculative content may be stored in the cache 122, and the speculative execution may be discarded. When the user click triggers a user operation at the operation 310 (e.g., clicks a button, etc.) associated with the speculative content, a fresh execution may complete with reduced user-perceived latency by extracting the speculative content from the cache 122.

In accordance with various embodiments, the speculative engine 124 may enable speculation of equivalence classes. Some applications, such as an autocompleting text box, may include several sequences of low-level events that lead to equivalent speculative opportunities. In some embodiments, the speculative engine 124 may speculatively fetch search results for potential autocompletions. For example, consider one user who types "ba" into a text box, and another user who types "be," hits backspace once, and then types "a." Both users eventually type "ba" into the text box, which leads to an equivalent set of autocompletion suggestions. Speculating upon all input permutations that reach "ba" may be an undesirable use of computing resources. Instead, the speculative engine 124 may only speculate on one instance of each equivalence class (e.g., "ba" or another set of autocompletion prefixes), and then map equivalent user inputs to a canonical speculation. The instance of an equivalence class that the speculative engine 124 uses to trigger a speculation may be defined by a developer using speculation tags or the like, which are shown with the operation 304. Thus, speculation tags are markers that may be implemented by a developer to indicate equivalence classes, that when read by the speculative engine 124, trigger speculative actions (e.g., speculative download, upload, rendering, etc.).

Figure 4:
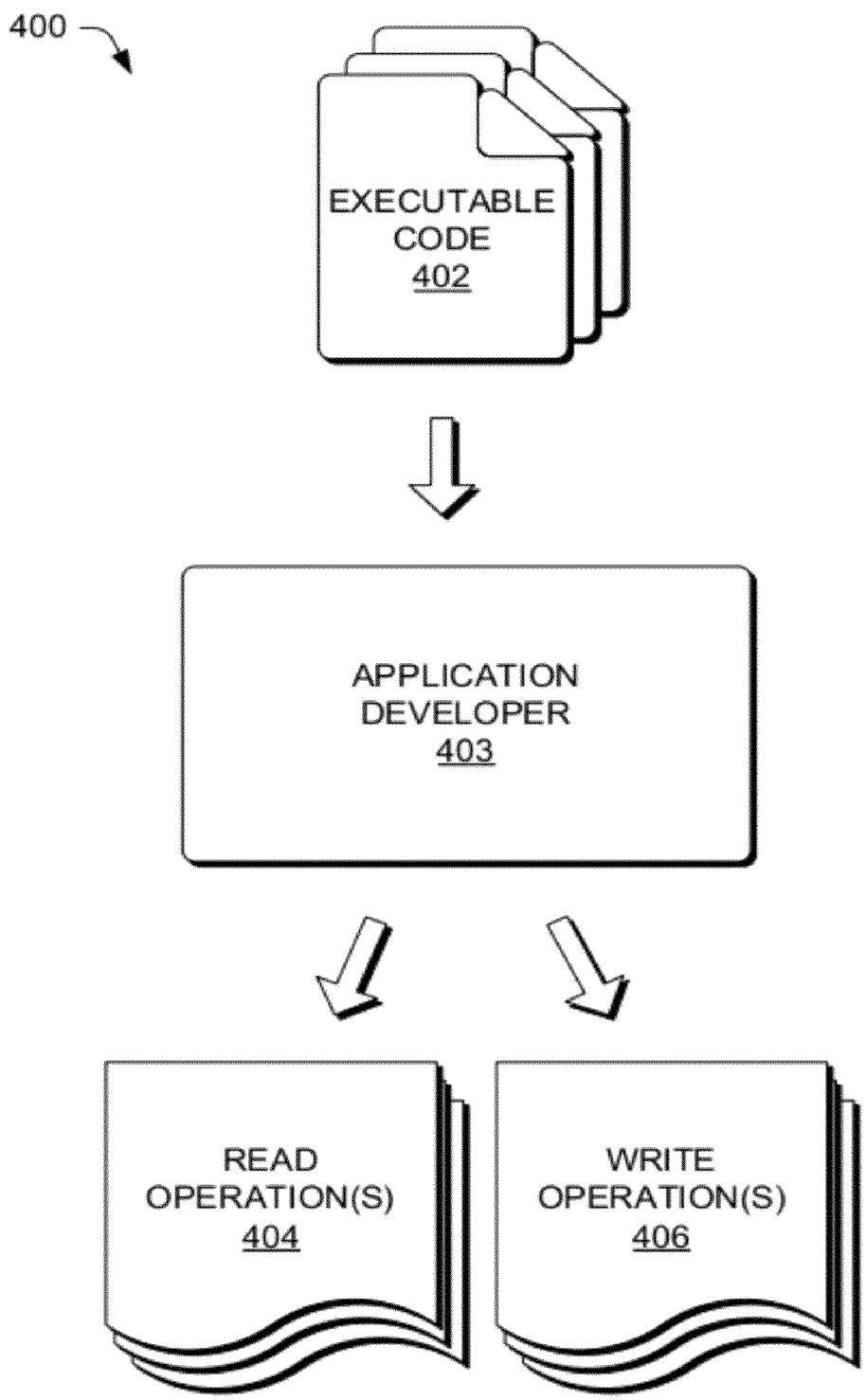
FIG. 4 is a block diagram of an illustrative process for separating read operations and updates of activity to avoid undesirable side effects of speculative execution.

FIG. 4 is a block diagram of an illustrative process 400 for separating read operations and updates of activity to avoid undesirable side effects of speculative execution. Executable code 402 may be analyzed by an application developer 403, who may then identify read operations 404 and write operations 406 of the executable code.

One objective to using speculative execution is to prevent disruption of a user experience with the browser 112. Thus, it is undesirable to disturb a foreground state on either the clients 108(1)-(n) or the server 104 when the speculative engine 124 performs prefetching activities such as at the operations 306 and 308.

As an example, a webmail client may use Asynchronous JavaScript and XML (AJAX) to wrap calls to an Internet Message Access Protocol (IMAP) server. A fetchMessage( ) operation may update client-side metadata (e.g., a list of which messages have been fetched) and server-side metadata (e.g., which of the fetched messages should be marked as read). To speculate on such a read/write operation, the application developer 403 may explicitly separate the operations into a read portion and a write portion. The application developer 403 may split the fetchMessage( ) operation into a read-only downloadMessage( ) operation and a metadata-writing markMessageRead( ) operation. The read-only operation may then download an email from the server, but specify in the IMAP request that the server should not mark the message as read. The markMessageRead( ) tells the server to update this flag, effectively committing the message fetch on the server-side. Inside fetchNewMessage( ), the call to markMessageRead( ) is conditioned on whether the message fetch is speculative. Although downloadMessage( ) may be read-only with respect to the server, it may update client-side JavaScript state. So, when speculating on fetchNewMessage( ), the speculative engine 124 may run downloadMessage( ) in a speculative execution context. In speculative or non-speculative mode, downloadMessage( ) places AJAX responses into a new cache provided by the speculative engine 124. Later, when downloadMessage( ) runs in non-speculative mode (after a user request), the cache 122 is checked to see if it contains the message, which if present in the cache will avoid a refetch from the server 104 and reduce user-perceived latency.

Figure 5:
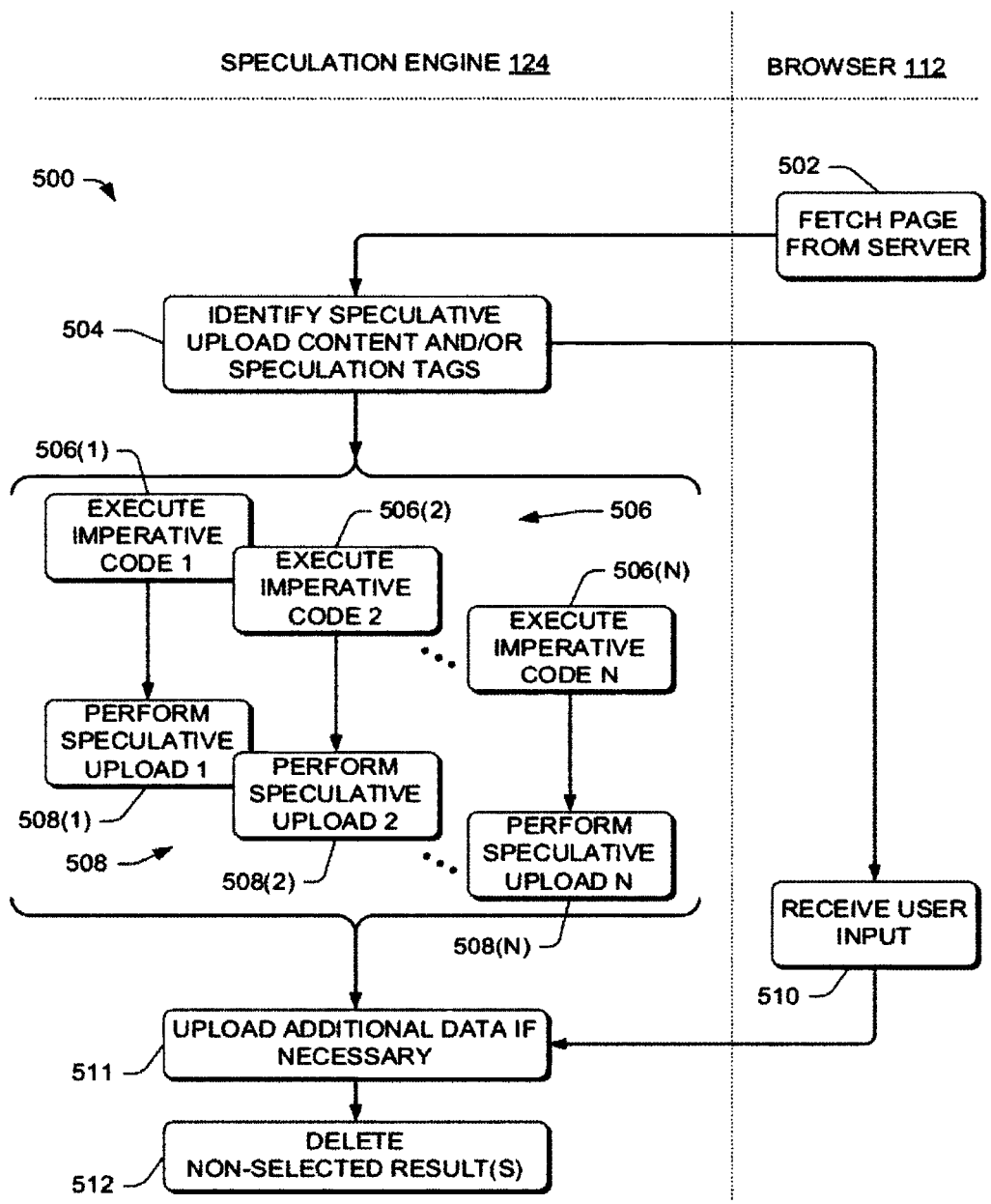
FIG. 5 is a flow diagram of an illustrative process for providing speculative uploading of content from a client to a server.

FIG. 5 is a flow diagram of an illustrative process 500 of providing speculative uploading of content from any one of the clients 108(1)-(n) to the server 104. The process 500 is organized to depict the component (e.g., the speculative engine 124 or the browser 112) that is most likely to participate in the described operation. The order in which the operations are described is not intended to be construed as a limitation, and any number of the described blocks can be combined in any order and/or in parallel to implement the process.

At 502, the browser 112 may fetch a web page from the server 104 for display to the user 106 via any one of the clients 108(1)-(n).

At 504, the speculative engine 124, using the speculative upload tool 128, may identify instances of executable code of the web page that cause content to be uploaded from one of the clients 108(1)-(n) to the server 104.

At 506, the speculative upload tool 128 may execute imperative code. The imperative code may be executed in an environment that does not disrupt a user experience (use of the browser 112), such that the user is unaware of the execution of the imperative code at 506. As shown in the process 500, multiple instances of executable code may be executed by the speculative upload tool 128, such as at 506(1)-506(N).

At 508, the speculative upload tool 128 may perform a speculative upload. The executions of the imperative code at 506(1)-506(N) may be used to identify speculative content to perform a speculative upload 508(1)-508(N), respectively. The speculative content may then be stored in the cache 122 (on the server 104) to enable reducing user-perceived latency when user input is received to initiate an instance of the imperative code.

At 510, the browser 112 may receive user input for an instance of the imperative code that has been executed at 506 and has had content speculatively uploaded at 508. The browser 112 may execute the user imperative code, determine content requested by the code, and then trigger the server 104 to search the cache 122 for the speculative content, which may be present in the cache 122 if it was downloaded at the operation 508.

At 511, any additional data maybe uploaded that is identified by the user, but not uploaded by the speculative engine 124 at the operation 508. For example, when a user adds an addition file to upload and then immediately clicks a submit button, the additional file may be uploaded at the operation 511 when it has not been speculatively uploaded in advance by the speculative engine 124 at the operation 508.

At 512, the speculative engine may delete non-selected results from the cache 122 which were speculatively uploaded but not requested by the user (via a user input) prior to an expiration of a timeout threshold.

Figure 6:
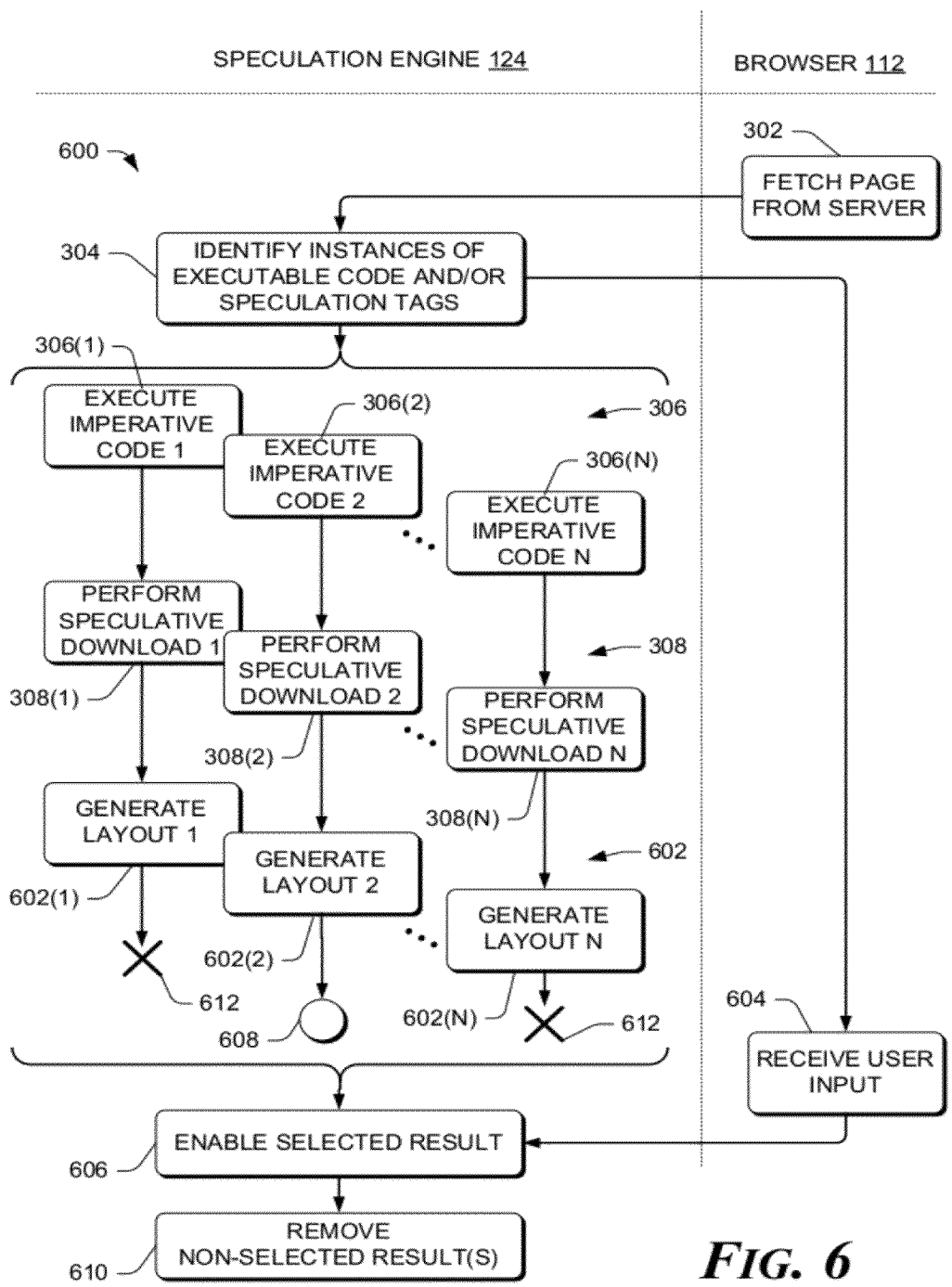
FIG. 6 is a flow diagram of an illustrative process for providing speculative execution of event handlers on a web page to initiate prefetching of content and layout of the content by a browser on a client.

FIG. 6 is a flow diagram of an illustrative process 600 for providing speculative execution of event handlers on a web page to initiate prefetching of content and layout of the content by a browser on any one of the clients 108(1)-(n). The process 600 is organized to depict the component (e.g., the speculative engine 124 or the browser 112) that is most likely to participate in the described operation. The order in which the operations are described is not intended to be construed as a limitation, and any number of the described blocks can be combined in any order and/or in parallel to implement the process. Some of the operations included in the process 600 are similar or identical to operations discussed with reference to the process 300 and may perform the same or similar functions as disclosed above under the section that describes the process 300.

In some web applications, when the user performs an action, a rich web page dynamic content set replaces most of the page's content. This update requires the processor(s) 118 of the client 108 to perform work for layout and rendering. Layout latency occurs when the browser 112 traverses a Document Object Model (DOM) tree of the new content and determines the spatial arrangement of the elements. Rendering latency occurs when laid-out content must be drawn to the screen. While a speculative cache loading can reduce user-perceived latency of the download operations, it does not reduce user-perceived latency of layout and rendering.

In one or more embodiments, at 602, the speculative layout tool 130 may generate a layout for a speculative page that includes the speculative download. Layouts may be generated at 602(1)-602(N) that correspond to the operations 308(1)-308(N). For example, a speculative download at 308(1) may include speculative content of an image. The generated layout at 602(1) may be generated by laying out the web page by adjusting borders, reformatting text, inserting the image, or other necessary actions to generate a layout that accommodates the speculative content. The layout may be hidden from the user in the speculative browser state 136 until the browser 112 receives a user input at the operation 604. For example, the speculative engine 124 may speculatively execute an event handler and load speculative content in a hidden browser <iframe>. Rather than discarding the speculative domain when the execution finishes, the speculative layout tool 130 may save the already laid-out content the cache 122 (or another suitable storage location).

At 606, the speculative engine 124 may enable a speculative layout at 608 which was generated at the operation 602. For example, the second layout generated at the operation 602(2) may be enabled at 608, and thus made visible to the user while reducing user-perceived latency due to computing (client) processing time that would otherwise exist had the layout not been generated at the operation 602. A result may be a visibly smoother transition from a first layout (prior to the operation 604) to a second layout that is enabled at the operation 608 after the user interaction at 604.

At 610, the speculative engine 124, via the speculative layout tool 130, may optionally remove non-selected result(s) of the generated layouts from the operation 602. For example, a first and last layout from the operations 602(1), 602(N), respectively, may be discarded at 612 to free up the cache 122 or the memory 120. Alternatively, the non-selected layouts may be kept in the cache for potential use by later user requests.

Figure 7:
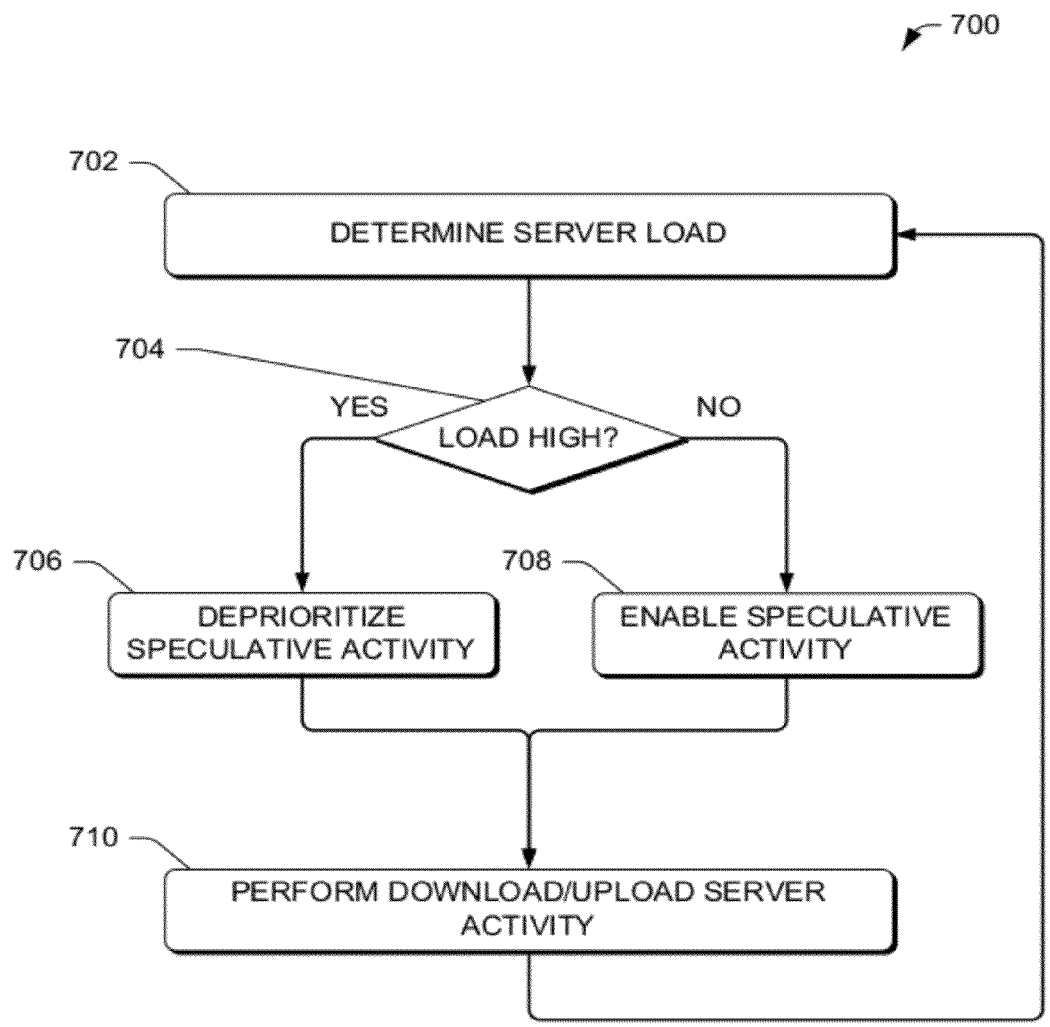
FIG. 7 is a flow diagram of an illustrative process for smoothing server processing loads that result from speculative execution.

FIG. 7 is a flow diagram of an illustrative process 700 of smoothing server loads that result from speculative execution. Some client delays are not due to network delays, but instead due to congestion at the server 104 because of varying loads imposed by any one of the clients 108(1)-(n) (content requests from many of the clients). The speculative engine 124, via the smoothing tool 132, may be used to spread client workload across time by using selective admission control at the server 104.

At 702, the smoothing tool 132 may determine the load of the server 104. At a decision point at 704, when the load is determined to be high, the smoothing tool 132 may advance to 706 and reject or deprioritize speculative content requests at 706. However, when the load is not determined to be high at the decision operation 704, the smoothing tool may advance to 708 and implement speculative requests earlier in time at 708. At 710, the server 104 may perform download/upload server activities based on the prioritizations resulting from the operations 706, 708, and thus the associated load of the server 104 may remain more constant over a period of time.

Illustrative Implementation

Figure 8:
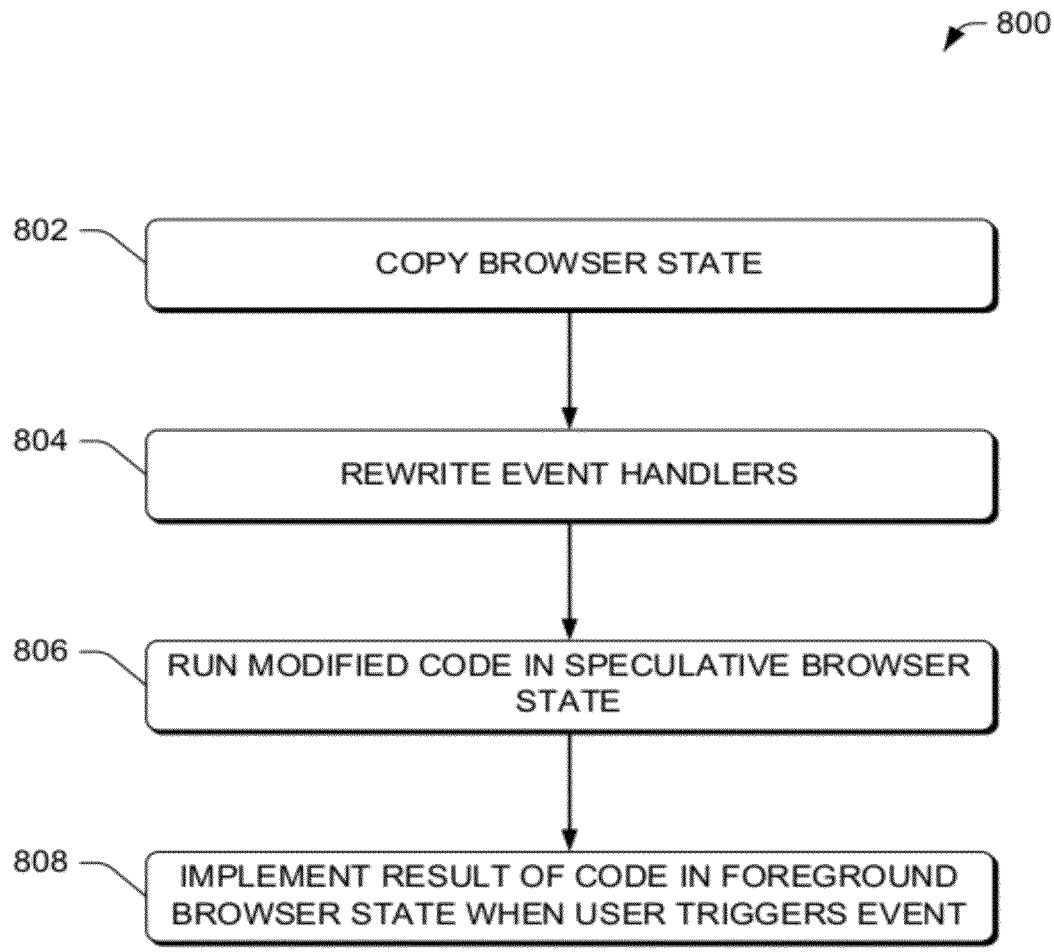
FIG. 8 is a flow diagram of an illustrative process for implementing speculative execution of imperative code to improve network performance.

FIG. 8 is a flow diagram of an illustrative process 800 for implementing speculative execution of imperative code to improve network performance. In order to run event handlers or other imperative code without disrupting a user's experience, the event handlers are executed in the speculative browser state 136 that is not visible to the user. In this speculative (or alternative) browser state, any one of the clients 108(1)-(n) (or the server 104 in some instances) may perform actions that enable reducing user-perceived latency due to network bandwidth or computing processing.

At 802, the speculative engine 124 may copy a portion of the browser state of the browser 112. For example, the event handlers and other code of a web page read by the browser 112 (such as the web page read at the operation 302) are duplicated.

At 804, the speculative engine 124 rewrites the event handlers. The event handlers are rewritten to direct any action (outcome of the event handler) to occur in the speculative browser state 136 and not disrupt the user's experience in the actual (viewed) browser state.

At 806, the speculative engine 124 runs the modified code in the speculative browser state 136 to determine whether additional content may be downloaded as speculative content from the server 104 to at least one of the clients 108(1)-(n) to reduce user-perceived latency.

At 808, the speculative content may be presented in the foreground (actual) browser state as viewed by the user to reduce user-perceived latency which may occur when any one of the clients 108(1)-(n) attempts to obtain content from the server 104 that has not previously been transmitted to the client.

The following sections discuss further implementation details for each of the operations described in the process 800.

Making Event Handlers Speculative

Implementation of the speculative engine 124 may consist of a client-side rewriting library and an application program interface (API) to invoke that library to control speculation. The speculative engine 124 may also include a server-side library to facilitate speculative data uploads.

On any one of the clients 108(1)-(n), the speculative engine 124 may prepare a speculative execution by creating a trigger pair consisting of a user input element and an event handler for that element. When directed to speculate on a trigger, the speculative engine 124 may generate a shadow copy of the application state and an event handler rewritten to interact with the shadow state instead of the real state. The speculative engine 124 may invoke the new handler, and speculative execution may fetch data and update the shadow copy of the application state. The speculative engine 124 may store the completed speculation's shadow state in a table indexed by the trigger pair. Later, should the user actually generate the trigger event, the speculative engine 124 may commit the speculative state to the real domain.

To create a speculative version of an event handler attached to DOM node d, an application calls makeSpeculative(d, eventName). Table 1 (below) provides the HTML for a simple image viewer and demonstrates how makeSpeculative( ) is called. The makeSpeculative( ) step may accomplish two tasks. First, it creates a speculative browser context for the speculative computation. Second, it creates a new handler that performs the same computation as the original one, but reads and writes from the speculative context instead of the real one. Context cloning and function rewriting is described in detail below.

a. TABLE 1 b. <div id = " dispDiv" '>
   i. Image will be displayed here.
c. </div>
d. <buttontype = "button" id = "clickButton">
   i. Next picture
e. </button>
f. <script>
g. var imgUrls = [ "picX .jpg", "picY.jpg" ];
h. var imgIndex = 0;
i. var b = document.getElementById("clickButton");
j. b.onclick = function ( ) {
   i. var d = document.getElementById("dispDi v");
   ii. d.innerHTML = "<imgsrc ='"+
      1. imgUrls [++imgIndex % 2] +
      2. '">";
k. };
l. makeSpeculative(b, "nclick ");
m. </script>

The speculative engine 124 may clone different types of objects using different techniques. For primitive values, the speculative engine 124 may just return the value. For a built-in object like a String or a Date, the speculative engine 124 may call the relevant built-in constructor to create a semantically equivalent but referentially distinct object. These objects have native code implementations, meaning that their functionality is implemented by opaque browser code, not introspectable JavaScript.

Cloning functions, objects, and DOM nodes may require special logic. In JavaScript, calling a function's toString( ) function returns the source code for that function. To clone a function f, the speculative engine 124 calls eval(f.toString( )), using the built-in eval( ) routine to parse the source and generate a semantically equivalent function. Since JavaScript functions are firstclass objects, f may have properties. So, after cloning the executable portion of f, the speculative engine 124 uses a for-in loop to identify f's properties, deep-copying any properties that are found.

Cloning a user-defined object is similar to cloning a function. The speculative engine 124 may create an initially empty object with no properties. The speculative engine 124 finds the object's properties using a for-in loop and deep-copies any non-primitive values.

To clone a DOM tree with a root node n, the speculative engine 124 calls the native DOM method cloneNode(true), by which a boolean parameter indicates that n's DOM children should be deep-copied. The cloneNode( ) method does not copy event handlers or other application-defined properties belonging to a DOM node. Thus, speculative engine 124 copies these properties explicitly, traversing the speculative DOM tree in parallel with the real one and updating the properties for each speculative node. Non-event handler properties are deep-copied using the techniques described above. Since the speculative engine 124 rewrites handlers and associates special metadata with each trigger pair, the speculative engine assumes that user-defined code does not modify or introspect event handlers. So, speculative engine 124 shallow copies event handlers by reference.

To clone the whole browser context, the speculative engine 124 may first copy the real DOM tree. The speculative engine 124 then creates an invisible <iframe> tag. IFrames are typically used to contain web content from external servers, but the speculative engine uses IFrames to hold speculative DOM contexts. The speculative engine 124 installs the cloned DOM tree as the root tree of the <iframe>'s document object.

Next, the speculative engine 124 copies the application heap, which is defined as all JavaScript objects in the global name space, and all objects reachable from those roots. The speculative engine 124 may identify the global properties using a for-in loop over window. The speculative engine 124 deep-copies each of these properties and inserts the cloned versions into an initially empty object called specContext. The specContext will later serve as the global name space for speculative executions. Cloning may preserve tag structure, so the speculative engine 124 uses a table of visited objects to ensure that clone requests for an already-visited object return the preexisting clone.

Global variables can be referenced with or without the window.prefix. For example, assuming that a function has not defined a local variable name globalVar, its uses of names window.globalVar and globalVar refer to the same property. To prevent window.globalVar from falling through to the real window object, the speculative engine 124 adds a property to specContext called window that points to specContext. The speculative engine 124 also adds a specContext.document property, which points to the hidden <iframe>'s document object. This document object may force DOM requests in the speculative execution to touch the speculative DOM tree instead of the real one.

The speculative engine 124 may be unable to contain the side effects of some functions, and thus hides them from speculative executions. For example, window.open( ) creates a new browser window; this side effect is disallowed from speculative execution. Likewise, the array window.frames enumerates all of the frames on the page, both real and speculative engine 124's hidden speculative frames. The speculative engine 124 may insert open and frames properties with null values into specContext; speculative code that accesses them will throw an exception and be terminated by the speculative engine.

Once the speculative browser context has been generated, the speculative engine 124 may create a speculative version of the event handler (i.e., one that is semantically equivalent to the original one but interacts with the speculative context instead of the real one). The speculative engine 124 may employ JavaScript's "with" statement to accomplish this task. Within a with(obj) statement, properties of the object obj override global variables. For instance, if obj has a property p, then references to the variable p refer to obj.p rather than the global variable p.

Thus, the speculative engine 124 can create a speculative version of an event handler as follows. First, the speculative engine fetches the source code of the handler as a string by calling its toString( ) method. Then, the speculative engine alters the string by wrapping the function's source code in a with(specContext) statement. In so doing, the speculative engine turns references to global variables in the enclosed source into references to properties of specContext. Finally, speculative engine uses the eval statement to generate the compiled function object.

When the speculative engine 124 calls the new handler, each reference inside the function to a global property will be directed to the cloned property in specContext. In particular, whenever the function tries to manipulate the DOM through the document object, it will actually manipulate the specContext.document object, which is the speculative DOM tree inside the hidden <iframe>.

The with( ) statement binds lexically, so if the original event handler calls other functions, the speculative engine 124 may rewrite those as well. The speculative engine 124 does so "lazily." For every function (or method) call f( ) inside the original handler, the speculative engine 124 inserts a new variable declaration var rewritten f=rewriteFunction(f, specContext); and replaces calls to f( ) with calls to rewritten f( ). The speculative engine 124 does not rewrite function calls on the document object. These calls will be handled by the specContext.document object, which has already been set to refer to the speculative DOM tree.

If a speculative execution creates a new global property, the creation "falls through" the "with" statement and modifies the real global name space. Because JavaScript is single-threaded, the speculative engine 124 can inspect the global state after speculation terminates, and move the new globals into specContext before they are observed by the real execution. Likewise, a speculative execution can delete a global property from its specContext. The speculative engine 124 rewrites delete statements to collect a list of tombstones, and upon commit, removes the corresponding properties from the real global name space.

A complication to copying global state is JavaScript closures. Whenever a function object is created, it remembers its lexical scope in an activation record, and uses that scope for name resolution even if it is later invoked from a different scope. Unfortunately, these activation records are not introspectable. If they escape cloning, they become state shared with the real execution. To avoid this occurrence, the speculative engine 124 rewrites any code that returns a closure to use explicitly-managed activation objects, rather than the implicit scope created by the activation record. Then, when the speculative engine 124 creates a speculative context, it can clone this activation object using its standard techniques. Note that this rewriting is required of all code that might create a closure reachable from an event handler that may later be speculated upon; lazy application to the call graph visited by a particular handler is inadequate.

Committing Speculative State

The speculative engine 124 may update the DOM tree root in the non-speculative context, making it point to the DOM tree in the committing speculation's hidden <iframe>. Next, the speculative engine 124 updates the heap state. A for-in loop enumerates the heap roots in specContext and assigns the corresponding properties in the real global name space; this moves both updated and newly created roots into place. Finally, the speculative engine 124 deletes from the real global heap the properties named by the tombstones in specContext.deletedGlobals.

In some embodiments, the speculative engine 124 delays committing a speculative domain until its in-flight AJAX calls complete, to avoid triggering browser bugs when the calls return to a disappeared <iframe>. This rare occurrence momentarily stalls local interactivity in exchange for preserving the AJAX request's head start on network latency.

By default, the speculative engine 124 may re-speculate on a trigger pair whenever an associated speculation commits. For example, in the image viewer, this means that speculative engine speculatively fetches the next image as soon as the user requests the previously prefetched image. Applications can disable this behavior and explicitly call forceSpeculations( ) on the trigger pair as necessary.

Equivalence Classes

Each speculation may be bound to a trigger pair consisting of a general user interface (GUI) element and an event handler. When a user generates a real event for a trigger pair, the speculative engine 124 checks whether it has associated speculations that are appropriate for committing. In the simplest case, a trigger pair can only generate a single speculative outcome, and that outcome is always appropriate to commit.

For example, in the tab manager, a particular "load new tab" button is always associated with a particular AJAX request, and it is always safe to commit the speculative fetching of the tab content.

Some applications can generate multiple outcomes for a single trigger pair, or outcomes that should not be committed in all circumstances. For example, the speculative autocompleter waits for the user to type a few characters and then speculatively fetches the query results for predicted input strings. When the user submits her actual query, the speculative engine 124 may be able to determine whether the trigger pair has a speculative context appropriate for committing, given the real state of the browser. If the user wants to search for "food" but the speculative engine 124 speculatively fetched results for "fool," the speculative outcome should not be committed.

Applications use mutators to generate multiple speculable outcomes for a trigger pair, and equivalence classes to determine whether a particular outcome is suitable for committing in response to a real user event. When an application calls makeSpeculative( ) upon a trigger pair, it can specify three additional arguments, a mutator function, a mutator argument vector, and a state hash function. The mutator specifies how a newly cloned browser context should be changed before a speculative execution begins. Each element in the argument vector is a set of arguments to pass to an invocation of the mutator function. The mutator function, with one of its argument lists, transforms a newly cloned application context into a start state for a speculation. For example, in the autocompletion application, the mutator function assigns its sole argument to the query text field of the speculative context2; the mutation vector [["blue book"],["blue cross"]] would instruct the speculative engine 124 to speculate on these two search strings.

The state hash function takes a speculative or real global name space as an argument, and returns an application specific object which is equivalent for a speculative context and a real context only if the speculation is a realizable outcome of the current browser state. In our running example, the state hash( ) simply returns the search field text, so that the "blue book" speculation is eligible to commit if that is what the user has typed. If no hash-equivalent speculation is available, the speculative engine 124 invokes the original non-speculative event handler.

For input elements like text boxes with a combinatorial number of outcomes, mutators are a natural way to constrain the speculation space. State hashes also allows applications to map semantically equivalent but bitdifferent browser states to a single speculable outcome (e.g., by canonicalizing the search strings blue\tbook and blue\t\tbook to the same speculable outcome).

AJAX Caching

To support the caching of AJAX results, the speculative engine 124 may call a function cacheAdd(key, AJAXresult) and cacheGet(key). These functions may provide the expected functionality, allowing applications to associate AJAX results with arbitrary cache identifiers. The cache-warming code is still speculative code so event handling routines which call cacheAdd( ) are rewritten and executed in a speculative context.

Speculative Uploads

Upload forms typically consist of a file input text box and an enclosing submit form. After the user types a file name into the input form, the input element generates an onchange event. However, the file is not uploaded to the server until a user triggers the onsubmit event of the enclosing form, typically by clicking a button inside the form. The application can specify an onsubmit handler to validates the file names. If no such handler is defined, or it returns true, the browser posts the form to the server. The server's HTTP response to the post is sent to the target of the form. By default, the target is the current window, causing the browser to load a new page representing the server's response.

The speculative engine 124 may implement speculative uploads using a simple client/server protocol. On the client side, the developer specifies which file input should be made speculative by calling prePost (fileInput,callback). Inside prePost( ), the speculative engine 124 may first save a reference to any user-specified onsubmit form-validation handler, since the speculative engine may supply its own onsubmit handler shortly. The speculative engine 124 then installs an onchange event handler for the file input which will be called when the user selects a file to upload. The handler creates a cloned version of the upload form in a new invisible <iframe>, with all file inputs removed except the one representing the file to speculatively upload. If, in the speculative execution, the application's original onsubmit validator function succeeds, the speculation posts the speculative form to the server to a URL that accepts only speculative file uploads. The server component caches the uploaded file and its filename, and the client component records that the server has the file cached.

In the real domain, prePost( ) installs an onsubmit handler that lets the speculative engine 124 introspect the form before a user's real click posts the form. If the speculative engine finds a file input that has been cached at the server, speculative engine 124 replaces the file input tag with an ordinary input field with the value ALREADY UPLOADED:filename. Upon receipt, the server 104 inserts the cached file contents before passing the form to the application's server-side component.

The interface above may be least invasive to the application, but a speculation-aware application can provide upload progress feedback to the user by registering a progress callback handler with the speculative engine 124. The speculative engine 124 invokes this handler in the real domain when the speculative upload completes, so that the application can update its GUI.

Illustrative Optimizations

Lazy Cloning

For complex web sites, cloning the entire application heap can be unacceptably slow. The speculative engine 124 may offer an alternative lazy heap cloning implementation. The set of objects actually touched by a speculative execution is typically much smaller than the set of all heap objects, so lazy cloning often produces significant savings.

In lazy mode, the speculative engine 124 initially copies only the DOM tree and the heap variables referenced by DOM nodes. As the speculative computation proceeds, the speculative engine 124 rewrites functions on-the-fly as before. However, object cloning is now performed as a side effect of the rewriting process. The speculative engine's lexical analysis identifies which variable names refer to locals, parameters, and globals. Locals do not need cloning, nor do parameters since top-level event handlers take no arguments and cannot introduce global state through them. If the global has not yet been cloned, its object tree is cloned into specContext, and then the function is rewritten using the techniques already described.

Lazy cloning may introduce problems at commit time. Suppose that global objects X and Y both reference object Z. If the speculative execution touches X.Z, the speculative engine 124 clones X and Z. Y is not cloned because it is not reachable from the object tree rooted by X. Suppose that the speculative execution modifies Z and later commits. The speculative engine 124 updates the real X to point to the object tree at specContext.X. Now global names X and Y refer to distinct objects, one fresh and one stale. To solve this problem, the speculative engine 124 may have a checked lazy mode. Before the speculative engine 124 issues any speculative computations, it traverses every JavaScript object reachable from the global scope or the DOM tree, and annotates each object with parents, a list of parent pointers. A parent pointer identifies the parent object and property-name pair that refer to the given object. The speculative engine 124 copies parents by reference when cloning an object. When a lazy speculation commits, the speculative engine 124 uses the parents list to update stale child references in the original heap. Building the parent mapping may be slower than making a full heap copy. However, the parent mapping overhead amortizes across multiple speculations, whereas cloning the entire heap is a per-speculation overhead.

The speculative engine 124 also has an unchecked lazy mode in which the speculative engine clones lazily but assumes that stale child references never occur, thereby avoiding the construction and checking of the parent map. This assumption may seem overly presumptuous, but for modular applications, it is often valid. For example, the auto-completion widget is a stand-alone piece of JavaScript code. When a developer inserts a speculative version of it into an enclosing web page, the widget will not be referenced by other heap variables, and running in unchecked mode will not cause stale child references.

A developer can run the speculative engine 124 in checked mode with an assertion that reports when the assumption is violated. These reports enable the developer to refactor code into a form compatible with unchecked lazy mode. Full clone mode or checked lazy mode is adequately performant for many web sites and applications, but for some complex sites, unchecked lazy speculation is the only feasible mode, making checked mode refactoring a necessity.

Speculation Zones

Just as a typical speculative execution touches only a fraction of its object heap, it will often touch only a fraction of its DOM tree. For example, the autocompletion widget only modifies the <div> tag which will hold the fetched search results. DOM objects do not support adequate introspection to implement lazy cloning, thus checked lazy cloning is impossible. Instead, the speculative engine 124 provides for the DOM tree an analog of "eager unchecked mode" for the heap. The application may provide an optional speculation zone parameter to makeSpeculative( ) specifying the root of the DOM subtree that an event handler modifies. At speculation time, the speculative engine 124 will only clone the DOM nodes and JavaScript heap objects associated with this branch of the tree. Upon speculation commit, the speculative engine 124 splices in the speculative DOM branch but leaves the rest of the DOM tree undisturbed.

Speculation zones are also useful when the DOM tree contains rich objects with opaque internal state, such as a Flash movie or applet. The clone of such a node returned by cloneNode( ) would be initialized to its virgin state, which could be problematic. For instance, if a video were halfway through playing in the real display, when it was cloned and then spliced back into the real display, the user would observe the strange anomaly of the video player snapping back to the first frame. Speculation zones enable an application to avoid this phenomenon. By speculating around these objects, they avoid breaking user expectations about these objects' behavior.

Context Pools

The speculative engine 124 hides speculative computations within the "think time" of a user. The shorter the think time, the faster the speculative engine has to launch speculations to reduce user-perceived latencies. For example, time pressure is comparatively high in the search term autocompletion widget, since a fast typist may generate her search string quickly.

To remove object cloning from the critical path of issuing new speculations, the application can call createContextPool (N, hash, DOMtreeRoot). This function generates and caches N clones of the current browser environment. Each clone is tagged with the specified state hash; between verifying with state hash( ) and updating with a mutator, the developer is responsible for ensuring that the pool domains accurately reflect the real domain.

Using context pools, the entire cost of eager cloning or the initial cost of lazy cloning is paid in advance. For example, when the autocompletion widget initializes, it creates a domain pool of size 3. Later, when the user begins typing "foo" into the widget, the speculative engine 124 can use a mutator to rapidly specialize a domain from the pool and launch the relevant speculation.

Illustrative Computing System

Figure 9:
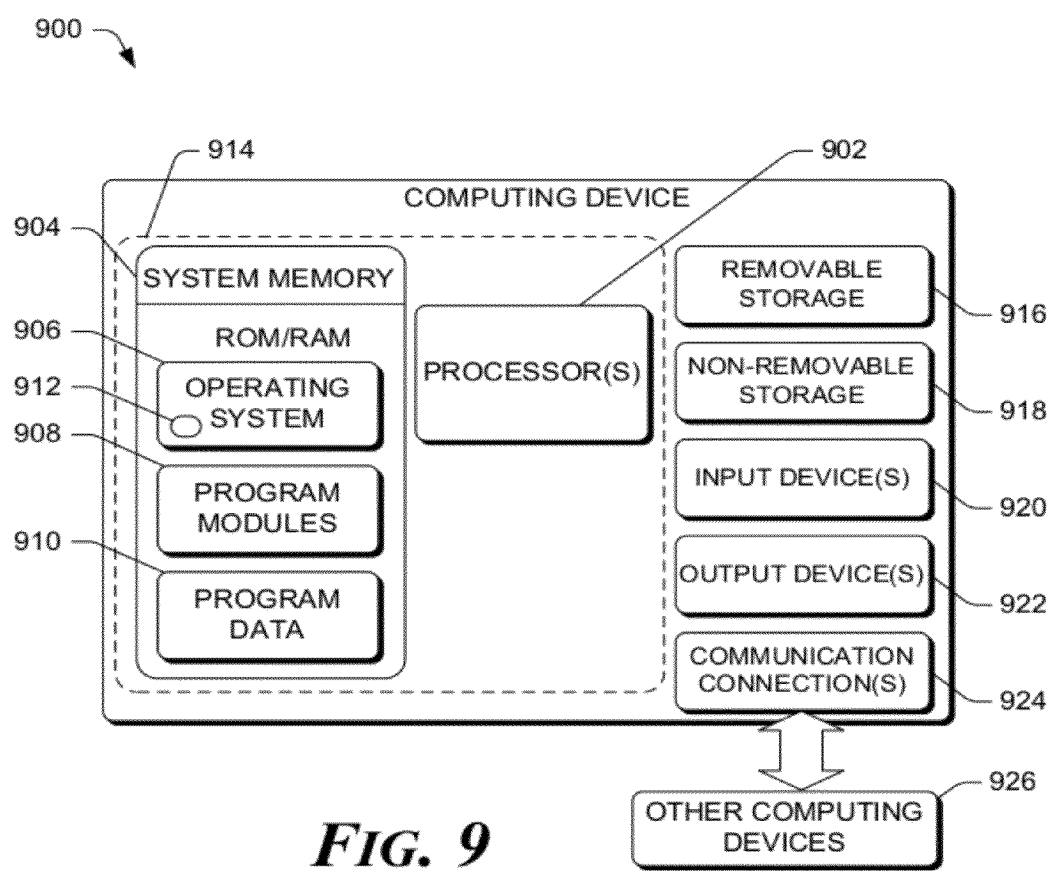
FIG. 9 is a block diagram of an illustrative computing device that may be used to implement speculative execution as shown in the environment of FIG. 1.

FIG. 9 is a block diagram of an illustrative computing device 900 that may be used to implement speculative execution of imperative code and speculative data transfer of content as shown in the environment of FIG. 1. It will readily be appreciated that the various embodiments of synonym identification techniques and mechanisms may be implemented in other computing devices, systems, and environments. The computing device 900 shown in FIG. 9 is only one example of a computing device and is not intended to suggest any limitation as to the scope of use or functionality of the computer and network architectures. The computing device 900 is not intended to be interpreted as having any dependency or requirement relating to any one or combination of components illustrated in the example computing device.

In a very basic configuration, the computing device 900 typically includes at least one processing unit 902 and system memory 904. Depending on the exact configuration and type of computing device, the system memory 904 may be volatile (such as RAM), non-volatile (such as ROM, flash memory, etc.) or some combination of the two. The system memory 904 typically includes an operating system 906, one or more program modules 908, and may include program data 910. The operating system 906 includes a component-based framework 912 that supports components (including properties and events), objects, inheritance, polymorphism, reflection, and provides an object-oriented component-based application programming interface (API). The computing device 900 is of a very basic configuration demarcated by a dashed line 914. Again, a terminal may have fewer components but will interact with a computing device that may have such a basic configuration.

The computing device 900 may have additional features or functionality. For example, the computing device 900 may also include additional data storage devices (removable and/or non-removable). Such additional storage is illustrated in FIG. 9 by removable storage 916 and non-removable storage 918. Computer storage media may include volatile and non-volatile, removable and non-removable media implemented in any method or technology for storage of information, such as computer readable instructions, data structures, program modules, or other data. The system memory 904, the removable storage 916, and the non-removable storage 918 are all examples of computer storage media. The computing device 900 may also have input device(s) 920 (e.g., keyboard, etc.) and output device(s) 922 (e.g., display, etc.).

The computing device 900 may also contain communication connections 924 that allow the device to communicate with other computing devices 926 (e.g., the data server(s) 118, etc.), such as over the network 108. The network(s) 108 may include wired networks as well as wireless networks. The communication connections 924 are one example of communication media. The communication media may typically be embodied by computer readable instructions, data structures, program modules, etc.

It is appreciated that the illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like. For example, some or all of the components of the computing device 900 may be implemented in a cloud computing environment, such that resources and/or services are made available via a computer network for selective use by client devices.

CONCLUSION

The above-described techniques pertain to speculative execution of rich web content to enhance user-perceived and/or actual network application performance. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method of reducing latency of network transmissions of web content between a server and a client, the method comprising:
    copying at least a portion of a current browser state including an event handler to create a speculative browser state, the speculative browser state being created by implementing speculative computations using context pooling to avoid disruption of a user experience during a user interaction with the current browser state, the event handler being designated as including speculative content by employing a lazy cloning designation;
    generating, from the event handler, a speculative event handler that directs resultants of the event handler to the speculative browser state;
    executing the speculative event handler in the speculative browser state;
    identifying the speculative content in response to the executing the speculative event handler;
    transmitting the speculative content for storage in a cache;
    uploading at least a portion of the transmitted speculative content from the client to the server in anticipation of a user-triggered upload; and
    retrieving at least one portion of the transmitted speculative content after a user triggers a speculated-upon event.

2. The computer-implemented method as recited in claim 1, further comprising identifying event handlers that are initiated by user events.

3. The computer-implemented method as recited in claim 2, further comprising:
creating a speculative layout using the speculative content transmitted for storage in the cache; and
retrieving the layout when the user triggers the speculated-upon event.

4. A computer-implemented method for enabling speculative execution and data transfer of speculative content between a server and a client, the method comprising:
identifying an event handler in web content made available to the client from the server over a network, the event handler being designated as including the speculative content by employing a lazy cloning designation;
implementing speculative computations using context pooling to create a speculative browser state and to avoid disruption of a user experience during a user interaction with a current browser state;
executing the event handler in the speculative browser state to determine whether a resultant of the event handler includes a request for additional content over the network;
transmitting the additional content as the speculative content between the client and the server after the resultant of the event handler requires the additional content, the transmitting the additional content comprising speculatively uploading the speculative content from the client to the server over the network; and
storing the speculative content in a cache for storage.

5. The computer-implemented method as recited in claim 4, further comprising using equivalence classes that map different user actions that result in a same browser event to a single canonical speculatable event.

6. The computer-implemented method as recited in claim 4, further comprising transmitting a prioritization signal to the server prior to the transmitting the additional content by the server, the prioritization signal enabling the server to prioritize the request as a lower priority than non-speculative requests to enable smoothing loads of the server.

7. The computer-implemented method as recited in claim 4, further comprising:
creating the speculative browser state by copying at least a portion of the current browser state, the current browser state including the event handler; and
modifying program code of the event handler to direct actions of the event handler to update the speculative browser state.

8. The computer-implemented method as recited in claim 7, wherein the at least a portion of the current browser state comprises Document Object Model (DOM) objects and the current browser state can be updated by the event handlers.

9. The computer-implemented method as recited in claim 4, wherein the transmitting the additional content includes downloading the speculative content from the server to the client over the network.

10. The computer-implemented method as recited in claim 9, further comprising:
performing a function of creating a speculative layout using the downloaded speculative content,
storing the speculative layout in the speculative browser state, and
making the speculative layout visible to a user when the user triggers the event handler.

11. One or more computer storage media storing computer-executable instructions that, when executed on one or more processors, causes the one or more processors to performs acts comprising:
identifying a browser state having an event handler that is designated as including speculative content by employing a lazy cloning designation;
creating a copy of at least a portion of the browser state as a speculative browser state that includes the event handler, the speculative browser state being created by implementing speculative computations using context pooling to avoid disruption of a user experience during a user interaction with a current browser state;
modifying the event handler to direct actions to occur within the speculative browser state;
executing the event handler in the speculative browser to determine the actions of the event handler prior to user input; and
transmitting the speculative content between a client and a server when the actions of the event handler requires additional content, the transmitting the content comprising speculatively uploading the speculative content from the client to the server over the network;
storing the additional content as the speculative content in a cache.

12. The one or more computer storage as recited in claim 11, wherein the acts further comprise transmitting a prioritization tag with a request for additional content to enable smoothing load on a server by deprioritizing transmission of the additional content.

13. The one or more computer storage as recited in claim 11, wherein the at least a portion of the browser state to speculatively copy is selected by determining browser objects that are modified by the event handler.

14. The one or more computer storage as recited in claim 11, wherein the event handler includes a speculation tag created by a developer to enable identification of the event handler as a target for speculative execution.

15. The one or more computer storage as recited in claim 11, wherein the transmitting the speculative content includes downloading the additional content from the server to the client in advance of a user-initiated request for the additional content.

16. The one or more computer storage as recited in claim 15, wherein the acts further comprise creating a speculative layout using the speculative content downloaded from the server.

* * * * *